United States Patent
Li et al.

(10) Patent No.: US 11,650,875 B2
(45) Date of Patent: May 16, 2023

(54) ABNORMAL INODE DYNAMIC REPAIR METHOD AND SYSTEM, AND RELATED COMPONENT

(71) Applicant: INSPUR ELECTRONIC INFORMATION INDUSTRY CO., LTD., Shandong (CN)

(72) Inventors: Peng Li, Shandong (CN); Xiangrui Meng, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/786,812

(22) PCT Filed: Aug. 25, 2020

(86) PCT No.: PCT/CN2020/110985
§ 371 (c)(1),
(2) Date: Aug. 8, 2022

(87) PCT Pub. No.: WO2021/120664
PCT Pub. Date: Jun. 24, 2021

(65) Prior Publication Data
US 2023/0032428 A1    Feb. 2, 2023

(30) Foreign Application Priority Data
Dec. 20, 2019 (CN) .......................... 201911328598.6

(51) Int. Cl.
*G06F 11/00* (2006.01)
*G06F 11/07* (2006.01)
(Continued)

(52) U.S. Cl.
CPC .......... *G06F 11/0793* (2013.01); *G06F 16/13* (2019.01); *G06F 16/164* (2019.01)

(58) Field of Classification Search
CPC ..... G06F 11/0793; G06F 16/13; G06F 16/164
See application file for complete search history.

(56) References Cited

U.S. PATENT DOCUMENTS

| 9,043,280 B1 | 5/2015 | Patwardhan |
| 2003/0158863 A1 | 8/2003 | Haskin et al. |

(Continued)

FOREIGN PATENT DOCUMENTS

| CN | 1896957 A | 1/2007 |
| CN | 101697132 A | 4/2010 |

(Continued)

OTHER PUBLICATIONS

International Search Report of corresponding PCT application PCT/CN2020/110985, dated Oct. 30, 2020, 6 pages.

(Continued)

*Primary Examiner* — Joshua P Lottich
(74) *Attorney, Agent, or Firm* — Cooper Legal Group, LLC

(57) ABSTRACT

An abnormal index node (inode) dynamic repair method, system, and apparatus, and a readable memory medium. The method includes: obtaining an overall memory structure of an abnormal inode in a memory, and converting the overall memory structure into an editable file; determining an abnormal field in the editable file according to error reporting information; writing an expected value of a file system to a position of the abnormal field in the editable file to obtain a repaired editable file; and importing the repaired editable file back to the memory.

17 Claims, 1 Drawing Sheet

(51) Int. Cl.
*G06F 16/16* (2019.01)
*G06F 16/13* (2019.01)

(56) References Cited

U.S. PATENT DOCUMENTS

| | | | | |
|---|---|---|---|---|
| 2011/0035428 A1* | 2/2011 | Thompson | ............... | G06F 16/13 |
| | | | | 709/201 |
| 2013/0091185 A1* | 4/2013 | Dar | ................. | G06F 3/064 |
| | | | | 707/812 |
| 2014/0188790 A1* | 7/2014 | Hunter | ................. | H04L 63/08 |
| | | | | 707/610 |
| 2015/0127973 A1 | 5/2015 | Porterfield | | |
| 2019/0251067 A1 | 8/2019 | Talagala et al. | | |

FOREIGN PATENT DOCUMENTS

| | | |
|---|---|---|
| CN | 101770410 A | 7/2010 |
| CN | 103092746 A | 5/2013 |
| CN | 103150226 A | 6/2013 |
| CN | 104750703 A | 7/2015 |
| CN | 105760241 A | 7/2016 |
| CN | 106294026 A | 1/2017 |
| CN | 107370834 A | 11/2017 |
| CN | 108108422 A | 6/2018 |
| CN | 109189501 A | 1/2019 |
| CN | 109271402 A | 1/2019 |
| CN | 109947747 A | 6/2019 |
| CN | 111125008 A | 5/2020 |
| GB | 2517435 A | 2/2015 |

OTHER PUBLICATIONS

Written Opinion of International Searching Authority of corresponding PCT/CN2020/110985, dated Oct. 30, 2020, 9 pages.
Notice of Allowance cited in CN201911328598.6, dated Mar. 3, 2022, 3 pages.

* cited by examiner

ABNORMAL INODE DYNAMIC REPAIR METHOD AND SYSTEM, AND RELATED COMPONENT

RELATED COMPONENT

This application claims priority to Chinese Patent Application No. 201911328598.6, filed on Dec. 20, 2019, in China National Intellectual Property Administration and entitled "Abnormal Inode Dynamic Repair Method and System, and Related Component", the contents of which are hereby incorporated by reference in its entirety.

FIELD

The present disclosure relates to the field of distributed file system, and particularly to an abnormal index node (inode) dynamic repair method and system, and related components.

BACKGROUND

During the operation of a distributed file system, a core data structure "inode" of file metadata may have some missing fields or invalid field values sometimes due to some unknown anomalies, and furthermore, the file system has an error and is unable to keep on operating during request processing and inode checking because the field values are inconsistent with expected values of the file system.

According to an existing repair technology, part of fields, such as size and modification time, are recovered mainly by scanning file data of the corresponding inode. However, many fields in an inode are metadata-specific and cannot be corrected by scanning file data.

SUMMARY

In view of this, an objective of the present disclosure is to provide an abnormal inode dynamic repair method and system, and related components. The specific solution is as follows.

An abnormal inode dynamic repair method is provided, including:

obtaining an overall memory structure of an abnormal inode in a memory, and converting the overall memory structure into an editable file;

determining an abnormal field in the editable file according to error reporting information;

writing an expected value of a file system to a position of the abnormal field in the editable file to obtain a repaired editable file; and importing the repaired editable file back to the memory.

In some embodiments, the dynamic repair method further includes:

writing metadata corresponding to the repaired editable file to an underlying memory cell.

In some embodiments, the process of writing metadata corresponding to the repaired editable file to an underlying memory cell specifically includes:

calling a refresh interface of the file system actively to write the metadata corresponding to the repaired editable file to the underlying memory cell.

In some embodiments, the process of writing an expected value of a file system to a position of the abnormal field in the editable file specifically includes:

writing the expected value of the file system to the position of the abnormal field in the editable file to supplement a missing field or replace an abnormal field value.

In some embodiments, the process of importing the repaired editable file back to the memory specifically includes:

converting the repaired editable file into a memory structure for importing back to the memory.

In some embodiments, the editable file is specifically:

an editable file stored in a nested structure and a text form.

Correspondingly, the present disclosure also discloses an abnormal inode dynamic repair system, including:

a conversion module, configured to obtain an overall memory structure of an abnormal inode in a memory, and convert the overall memory structure into an editable file;

an anomaly searching module, configured to determine an abnormal field in the editable file according to error reporting information;

a repair module, configured to write an expected value of a file system to a position of the abnormal field in the editable file to obtain a repaired editable file;

an importing module, configured to import the repaired editable file back to the memory.

In some embodiments, the dynamic repair system further includes:

a disk write module, configured to write metadata corresponding to the repaired editable file to an underlying memory cell.

Correspondingly, the present disclosure also discloses an abnormal inode dynamic repair apparatus, including:

a storage device, configured to store a computer program;

a processor, configured to execute the computer program to implement any steps of the abnormal inode dynamic repair method as described above.

Correspondingly, the present disclosure also discloses a readable memory medium, storing a computer program that is executed by a processor to implement any steps of the abnormal inode dynamic repair method as described above.

The present application discloses an abnormal inode dynamic repair method, including: obtaining an overall memory structure of an abnormal inode in a memory, and converting the overall memory structure into an editable file; determining an abnormal field in the editable file according to error reporting information; writing an expected value of a file system to a position of the abnormal field in the editable file to obtain a repaired editable file; and importing the repaired editable file back to the memory. According to the present application, the memory structure of the abnormal inode is directly modified without scanning file data, whereby the situation of field missing or invalid field values is avoided, dynamic inode repairing is achieved, and recovery of the file system to normal operation may be ensured.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

Embodiment 1

A core data structure "inode" of file metadata may have some missing fields or invalid field values sometimes due to some unknown anomalies, and furthermore, the file system has an error and is unable to keep on operating during request processing and inode checking because the field values are inconsistent with expected values of the file system. According to the present application, a memory structure of an abnormal Inode is directly modified, whereby the situation of field missing or invalid field values is avoided, dynamic inode repairing is achieved, and recovery of a file system to normal operation may be ensured.

Figure 1:
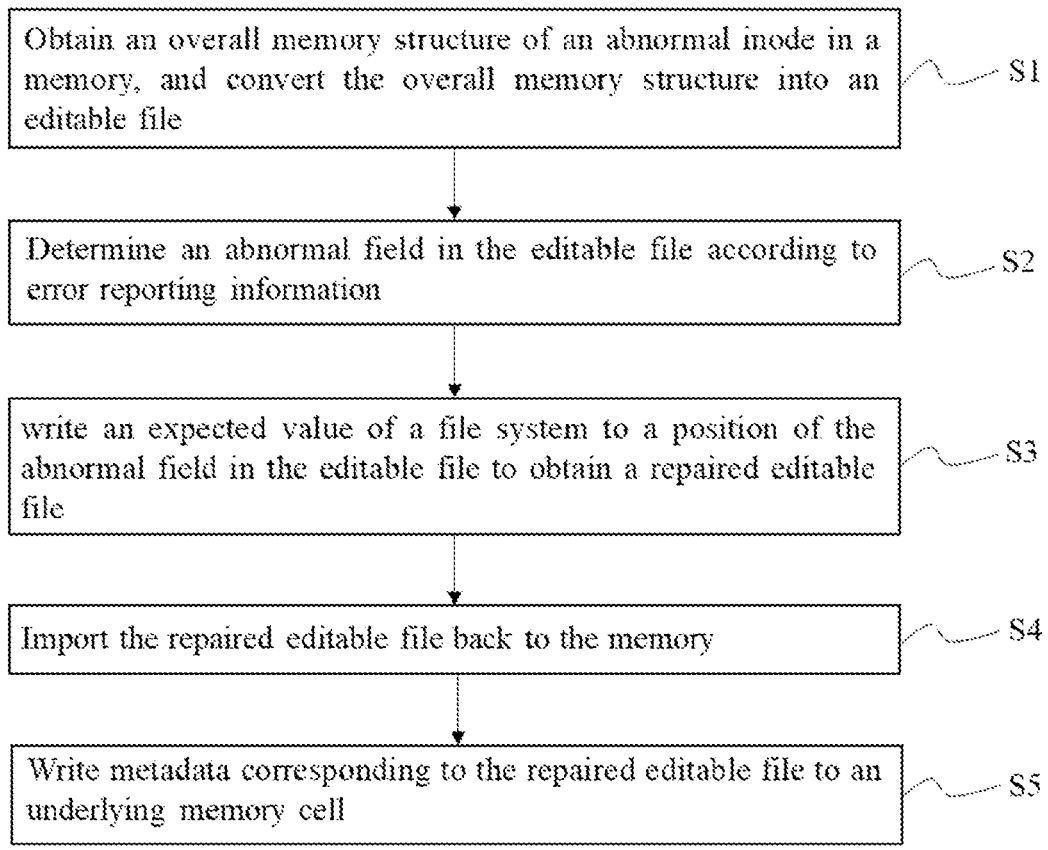
FIG. 1 is a flowchart of an abnormal inode dynamic repair method according to an embodiment of the present disclosure.

The embodiment of the present disclosure discloses an abnormal inode dynamic repair method, which, referring to FIG. 1, includes the following steps.

S1: obtain an overall memory structure of an abnormal inode in a memory, and convert the overall memory structure into an editable file.

An inode structure includes many fields that are nested, and if a relatively deep nested field is to be modified, it is necessary to search the field level by level, which is relatively complex in processing. Therefore, in the present embodiment, no command statement is used for judgment or field edition, and instead, the overall memory structure is converted into an editable file first to find an abnormal field.

Further, an example of the exported editable file is as follows:

```
inode_xxx      //the form after the inode binary structure in the
memory is imported as a text
{
  ino          //ino field, including two subfields
  {
    parent_number : xxx
    self_number : xxx
  }
  time: xxx    //time field
  dentry       //dentry field, where the path field further includes
other fields
  {
    count: xxx
    path
    {
      name: xxx
      linkage
      {
        remote_parent:xxx
        ......   //omitted
      }
    }
  }
}
```

It can be understood that, for ease of reading and position determination, the editable file may specifically be an editable file stored in a nested structure and a text form. In such case, the editable file of the text form still retains the nested structure of an inode structure, but the text form is apparently superior in visualization of the nested structure.

S2: determine an abnormal field in the editable file according to error reporting information.

Specifically, the abnormal field determined according to the error reporting information usually includes two conditions: one is field missing, and the other is abnormal field value, such as abnormal field value of parent_number, self_number, or count. Due to the abnormal field, the file system has an error and is unable to keep on operating.

S3: write an expected value of a file system to a position of the abnormal field in the editable file to obtain a repaired editable file.

Based on different conditions of the abnormal field, the process that an expected value of a file system is written to a position of the abnormal field in the editable file specifically includes:

write the expected value of the file system to the position of the abnormal field in the editable file to supplement a missing field or replace an abnormal field value.

S4: import the repaired editable file back to the memory.

Further, the process of importing the repaired editable file back to the memory specifically includes: converting the repaired editable file into a memory structure for importing back to the memory.

It can be understood that the repaired editable file is coded according to a format in the inode structure in the memory, and then the original overall memory structure in the memory is overwritten with a coded content by use of a memory copy function provided by an operating system. In such case, each field value in the overall memory structure is normal and reaches the expected value of the file system.

Further, to prevent modification and loss in the memory after reboot of the file system, the dynamic repair method further includes the following step.

S5: write metadata corresponding to the repaired editable file to an underlying memory cell.

Specifically, the operation of writing the metadata to the underlying memory cell may be completed by a metadata disk mechanism that periodically executes operations in the file system. However, to help to write repaired and modified contents to the underlying memory cell as soon as possible to ensure the persistence of the inode structure, a write operation may be executed actively. That is, the process that metadata corresponding to the repaired editable file is written to an underlying memory cell specifically includes:

The present application discloses an abnormal inode dynamic repair method, including: obtaining an overall memory structure of an abnormal inode in a memory, and converting the overall memory structure into an editable file; determining an abnormal field in the editable file according to error reporting information; writing an expected value of a file system to a position of the abnormal field in the editable file to obtain a repaired editable file; and importing the repaired editable file back to the memory. According to the present application, the memory structure of the abnormal inode is directly modified without scanning file data, whereby the situation of field missing or invalid field values is avoided, dynamic inode repairing is achieved, and recovery of the file system to normal operation may be ensured.

Embodiment 2

Figure 2:
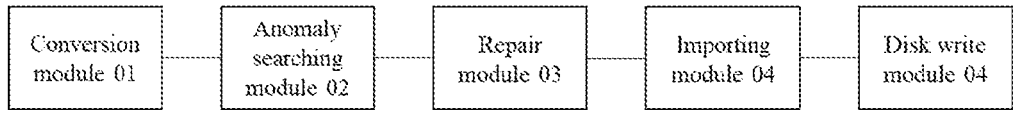
FIG. 2 is a structural distribution diagram of an abnormal inode dynamic repair system according to an embodiment of the present disclosure.

The embodiment of the present disclosure also discloses an abnormal inode dynamic repair system, which, referring to FIG. 2, includes:

a conversion module 01, configured to obtain an overall memory structure of an abnormal inode in a memory, and convert the overall memory structure into an editable file;

an anomaly searching module 02, configured to determine an abnormal field in the editable file according to error reporting information;

a repair module 03, configured to write an expected value of a file system to a position of the abnormal field in the editable file to obtain a repaired editable file;

an importing module 04, configured to import the repaired editable file back to the memory.

According to the present application, the memory structure of the abnormal inode is directly modified without scanning file data, whereby the situation of field missing or invalid field values is avoided, dynamic inode repairing is achieved, and recovery of the file system to normal operation may be ensured.

In some embodiments, the dynamic repair system further includes:

a disk write module 05, configured to write metadata corresponding to the repaired editable file to an underlying memory cell.

In some specific embodiments, the disk write module 05 is specifically configured to:

call a refresh interface of the file system actively to write the metadata corresponding to the repaired editable file to the underlying memory cell.

In some specific embodiments, the repair module 03 is specifically configured to:

write the expected value of the file system to the position of the abnormal field in the editable file to supplement a missing field or replace an abnormal field value.

In some specific embodiments, the importing module 04 is specifically configured to:

convert the repaired editable file into a memory structure for importing back to the memory.

In some specific embodiments, the editable file is specifically an editable file stored in a nested structure and a text form.

Embodiment 3

Figure 3:
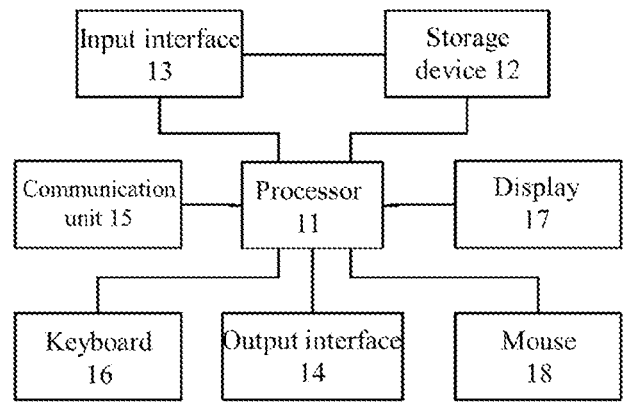
FIG. 3 is a structural distribution diagram of an abnormal inode dynamic repair apparatus according to an embodiment of the present disclosure.

Correspondingly, the embodiment of the present disclosure also discloses an abnormal inode dynamic repair apparatus, which, referring to FIG. 3, includes:

a processor 11 and a storage device 12. The processor 11 executes a computer program stored in the storage device 12 to implement the following steps:

obtaining an overall memory structure of an abnormal inode in a memory, and converting the overall memory structure into an editable file;

determining an abnormal field in the editable file according to error reporting information;

writing an expected value of a file system to a position of the abnormal field in the editable file to obtain a repaired editable file;

importing the repaired editable file back to the memory.

According to the present application, the memory structure of the abnormal inode is directly modified without scanning file data, whereby the situation of field missing or invalid field values is avoided, dynamic inode repairing is achieved, and recovery of the file system to normal operation may be ensured.

In some specific embodiments, the processor 11 may further specifically execute a computer subprogram stored in the storage device 12 to implement the following step:

writing metadata corresponding to the repaired editable file to an underlying memory cell.

In some specific embodiments, the processor 11 may specifically execute a computer subprogram stored in the storage device 12 to implement the following step:

calling a refresh interface of the file system actively to write the metadata corresponding to the repaired editable file to the underlying memory cell.

In some specific embodiments, the processor 11 may specifically execute a computer subprogram stored in the storage device 12 to implement the following step:

write the expected value of the file system to the position of the abnormal field in the editable file to supplement a missing field or replace an abnormal field value.

In some specific embodiments, the processor 11 may specifically execute a computer subprogram stored in the storage device 12 to implement the following step:

convert the repaired editable file into a memory structure for importing back to the memory.

In some specific embodiments, the editable file is specifically:

an editable file stored in a nested structure and a text form.

Further, the abnormal inode dynamic repair apparatus in the present embodiment may further include an input interface 13, an output interface 14, a communication unit 15, a keyboard 16, a display 17, and a mouse 18.

The input interface 13 is configured to obtain an externally imported computer program and store the obtained computer program in the storage device 12, and is further configured to obtain and transmit, to the processor 11, various instructions and parameters transmitted by an external terminal device such that the processor 11 executes corresponding processing based on the various instructions and parameters. In the present embodiment, the input interface 13 may specifically include, but not limited to, a Universal Serial Bus (USB) interface, a serial interface, a voice input interface, a fingerprint input interface, a hard disk reading interface, etc.

The output interface 14 is configured to output various data generated by the processor 11 to a terminal device connected therewith such that the other terminal device connected with the output interface 14 may obtain the various data generated by the processor 11. In the present embodiment, the output interface 14 may specifically include, but not limited to, a USB interface, a serial interface, etc.

The communication unit 15 is configured to establish a remote communication connection between the abnormal inode dynamic repair apparatus and an external server such that the abnormal inode dynamic repair apparatus may mount a mirror image file to the external server. In the present embodiment, the communication unit 15 may specifically include, but not limited to, a remote communication unit based on a wireless communication technology or a wired communication technology.

The keyboard 16 is configured to obtain various parameter data or instructions input by a user by clicking keycaps in real time.

The display 17 is configured to display information about an abnormal inode dynamic repair process in real time such that the user knows about a dynamic repair condition of the current inode timely.

The mouse 18 may be configured to help the user to input data and simplify user operations.

Embodiment 4

Further, the embodiment of the present application also discloses a computer-readable memory medium. The computer-readable memory medium mentioned herein includes a Random Access Memory (RAM), a memory, a Read-Only Memory (ROM), an electrically programmable ROM, an electrically erasable programmable ROM, a register, a hard disk, a removable hard disk, a Compact Disc Read-Only Memory (CD-ROM), or a memory medium in any other form well known in this art. The computer-readable memory medium stores a computer program that is executed by a processor to implement the following steps.

obtaining an overall memory structure of an abnormal inode in a memory, and converting the overall memory structure into an editable file;

determining an abnormal field in the editable file according to error reporting information;

writing an expected value of a file system to a position of the abnormal field in the editable file to obtain a repaired editable file;

importing the repaired editable file back to the memory.

According to the present application, the memory structure of the abnormal inode is directly modified without scanning file data, whereby the situation of field missing or invalid field values is avoided, dynamic inode repairing is achieved, and recovery of the file system to normal operation may be ensured.

In some specific embodiments, the processor 11 may further specifically execute a computer subprogram stored in the storage device 12 to implement the following step:

writing metadata corresponding to the repaired editable file to an underlying memory cell.

In some specific embodiments, the processor 11 may specifically execute a computer subprogram stored in the storage device 12 to implement the following step:

calling a refresh interface of the file system actively to write the metadata corresponding to the repaired editable file to the underlying memory cell.

In some specific embodiments, the processor 11 may specifically execute a computer subprogram stored in the storage device 12 to implement the following step:

writing the expected value of the file system to the position of the abnormal field in the editable file to supplement a missing field or replace an abnormal field value.

In some specific embodiments, the processor 11 may specifically execute a computer subprogram stored in the storage device 12 to implement the following step:

converting the repaired editable file into a memory structure for importing back to the memory.

In some specific embodiments, the editable file is specifically:

an editable file stored in a nested structure and a text form.

It is finally to be noted that those skilled in the art can understand that all or part of steps in each method of the above-mentioned embodiment may be completed by a program by instructing related hardware. The program may be stored in a computer-readable memory cell. The memory cell in all the embodiments of the present application includes a ROM, a RAM, a disk, or the like.

Further, the terms "include" "comprise" or any other variation thereof are intended to cover non-exclusive inclusion, so that a process, method, article, or apparatus that includes a set of elements includes not only those elements, but also other elements not expressly listed, or also include elements that are inherent to such process, method, article, or apparatus. Without further limitation, the elements defined by the statement "comprising a . . . " do not preclude the existence of additional identical elements in the process, method, article, or apparatus that include said elements.

All the embodiments in this specification are described in a progressive manner. Contents mainly described in each embodiment are different from those described in other embodiments.

The disclosed embodiments are described above to enable those skilled in the art to implement or use the present application. Various modifications to these embodiments are apparent to those skilled in the art. The general principles defined herein may be implemented in other embodiments without departing from the spirit or scope of the present application. Therefore, the present application will not be limited to these embodiments shown herein but is consistent with the largest scope consistent with the principles and novel characteristics disclosed herein.

What is claimed is:

1. An abnormal index node (inode) dynamic repair method, comprising:
    obtaining an overall memory structure of an abnormal inode in a memory, and converting the overall memory structure into an editable file;
    determining an abnormal field in the editable file according to error reporting information;
    writing an expected value of a file system to a position of the abnormal field in the editable file to obtain a repaired editable file; and
    encoding the repaired editable file according to a format in an inode structure in the memory, and then overwriting the overall memory structure in the memory with coded content by use of a memory copy function provided by an operating system.

2. The dynamic repair method according to claim 1, further comprising:
    writing metadata corresponding to the repaired editable file to an underlying memory cell.

3. The dynamic repair method according to claim 2, wherein the process of writing metadata corresponding to the repaired editable file to an underlying memory cell comprises:
    calling a refresh interface of the file system actively to write the metadata corresponding to the repaired editable file to the underlying memory cell.

4. The dynamic repair method according to claim 1, wherein the process of writing an expected value of a file system to a position of the abnormal field in the editable file to obtain a repaired editable file comprises:
    writing the expected value of the file system to the position of the abnormal field in the editable file to supplement a missing field or replace an abnormal field value.

5. The dynamic repair method according to claim 1, wherein the editable file is:
    stored in a nested structure and a text form.

6. The dynamic repair method according to claim 1, wherein the abnormal field determined according to the error reporting information comprises field missing and abnormal field value.

7. An abnormal index node (inode) dynamic repair apparatus, comprising:
    a storage device, configured to store a computer program;
    a processor, configured to execute the computer program to implement any steps of an abnormal inode dynamic repair method, wherein the abnormal inode dynamic repair method comprises:
        obtaining an overall memory structure of an abnormal inode in a memory, and converting the overall memory structure into an editable file;

determining an abnormal field in the editable file according to error reporting information;

writing an expected value of a file system to a position of the abnormal field in the editable file to obtain a repaired editable file; and encoding the repaired editable file according to a format in an inode structure in the memory, and then overwriting the overall memory structure in the memory with coded content by use of a memory copy function provided by an operating system.

8. The abnormal inode dynamic repair apparatus according to claim 7, wherein the abnormal inode dynamic repair method further comprises:

writing metadata corresponding to the repaired editable file to an underlying memory cell.

9. The abnormal inode dynamic repair apparatus according to claim 8, wherein the process of writing metadata corresponding to the repaired editable file to an underlying memory cell comprises:

calling a refresh interface of the file system actively to write the metadata corresponding to the repaired editable file to the underlying memory cell.

10. The abnormal inode dynamic repair apparatus according to claim 7, wherein the process of writing an expected value of a file system to a position of the abnormal field in the editable file to obtain a repaired editable file comprises:

writing the expected value of the file system to the position of the abnormal field in the editable file to supplement a missing field or replace an abnormal field value.

11. The abnormal inode dynamic repair apparatus according to claim 7, wherein the editable file is stored in a nested structure and a text form.

12. The abnormal inode dynamic repair apparatus according to claim 7, wherein the abnormal field determined according to the error reporting information comprises field missing and abnormal field value.

13. A non-transitory computer-readable storage medium, having a computer program stored thereon which, when executed by a processor, implements any steps of an abnormal inode dynamic repair method, wherein the abnormal inode dynamic repair method comprises:

obtaining an overall memory structure of an abnormal inode in a memory, and converting the overall memory structure into an editable file;

determining an abnormal field in the editable file according to error reporting information;

writing an expected value of a file system to a position of the abnormal field in the editable file to obtain a repaired editable file; and encoding the repaired editable file according to a format in an inode structure in the memory, and then overwriting the overall memory structure in the memory with coded content by use of a memory copy function provided by an operating system.

14. The non-transitory computer-readable storage medium according to claim 10, wherein the abnormal inode dynamic repair method further comprises:

writing metadata corresponding to the repaired editable file to an underlying memory cell.

15. The non-transitory computer-readable storage medium according to claim 14, wherein the process of writing metadata corresponding to the repaired editable file to an underlying memory cell comprises:

calling a refresh interface of the file system actively to write the metadata corresponding to the repaired editable file to the underlying memory cell.

16. The non-transitory computer-readable storage medium according to claim 13, wherein the process of writing an expected value of a file system to a position of the abnormal field in the editable file to obtain a repaired editable file comprises:

writing the expected value of the file system to the position of the abnormal field in the editable file to supplement a missing field or replace an abnormal field value.

17. The non-transitory computer-readable storage medium according to claim 13, wherein the editable file is stored in a nested structure and a text form.

* * * * *